(12) United States Patent
Narita et al.

(10) Patent No.: US 8,128,169 B2
(45) Date of Patent: Mar. 6, 2012

(54) SEAT RECLINING APPARATUS FOR VEHICLE

(75) Inventors: Masafumi Narita, Chita-gun (JP); Takashi Kitano, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 155 days.

(21) Appl. No.: 12/748,646

(22) Filed: Mar. 29, 2010

(65) Prior Publication Data

US 2010/0308634 A1    Dec. 9, 2010

(30) Foreign Application Priority Data

Jun. 9, 2009  (JP) ................................ 2009-138567

(51) Int. Cl.
*B60N 2/20* (2006.01)
*B60N 2/22* (2006.01)
*B60N 2/225* (2006.01)

(52) U.S. Cl. .................................. 297/362; 297/362.11
(58) Field of Classification Search .................. 297/362, 297/362.11
See application file for complete search history.

(56) References Cited

U.S. PATENT DOCUMENTS

| | | | | |
|---|---|---|---|---|
| 5,154,475 A * | 10/1992 | Kafitz | ............................ | 297/362 |
| 5,277,672 A * | 1/1994 | Droulon et al. | ........... | 297/362 X |
| 5,308,294 A * | 5/1994 | Wittig et al. | ............... | 297/362 X |
| 5,312,158 A * | 5/1994 | Wittig et al. | ................... | 297/362 |
| 5,586,833 A * | 12/1996 | Vossmann et al. | ......... | 297/362 X |
| 5,634,380 A * | 6/1997 | Scholz et al. | ............. | 297/362 X |
| 5,634,689 A * | 6/1997 | Putsch et al. | .................. | 297/362 |
| 5,871,414 A * | 2/1999 | Voss et al. | ...................... | 475/175 |
| 6,305,748 B1 * | 10/2001 | Ohba | .............................. | 297/362 |
| 6,578,921 B2 * | 6/2003 | Koga et al. | ...................... | 297/362 |
| 6,619,743 B1 * | 9/2003 | Scholz et al. | ................. | 297/362 |
| 6,755,470 B2 * | 6/2004 | Iwata et al. | ..................... | 297/362 |
| 6,918,635 B2 * | 7/2005 | Finner et al. | ................... | 297/362 |
| 7,086,699 B1 * | 8/2006 | Addison et al. | ........... | 297/362 X |
| 7,090,298 B2 * | 8/2006 | Lange | ........................... | 297/362 |
| 7,090,299 B2 * | 8/2006 | Lange | ........................... | 297/362 |
| 7,188,903 B2 * | 3/2007 | Finner et al. | ................... | 297/362 |
| 7,243,994 B2 * | 7/2007 | Cha | ................................ | 297/362 |
| 7,278,689 B2 * | 10/2007 | Guillouet | ........................ | 297/362 |
| 7,281,765 B2 * | 10/2007 | Scholz et al. | ................. | 297/362 |

(Continued)

FOREIGN PATENT DOCUMENTS

JP        2001-340154         12/2001

(Continued)

*Primary Examiner* — Rodney B White
(74) *Attorney, Agent, or Firm* — Oblon, Spivak, McClelland, Maier & Neustadt, L.L.P.

(57) ABSTRACT

A seat reclining apparatus for a vehicle includes a first arm arranged at a seat cushion, a second arm arranged at a seat back, an internal gear formed at the first arm, an external gear formed at the second arm and engaging with the internal gear, a first circumferential portion formed coaxially with the internal gear, a second circumferential portion formed coaxially with the external gear, first and second wedge members accommodated in an accommodating space formed between the first and second circumferential portions, a spring arranged between the first and second wedge members and biasing the first and second wedge members, a drive shaft rotating around a rotation axis of either one of the first and second arms, and a retention groove retaining a lubricant, formed on the circumferential contact surface of each of the first and second wedge members, and extending along a direction of the rotation axis.

6 Claims, 7 Drawing Sheets

U.S. PATENT DOCUMENTS

| | | | |
|---|---|---|---|
| 7,314,250 B1 * | 1/2008 | Eblenkamp et al. | 297/362 |
| 7,390,061 B2 * | 6/2008 | Lange | 297/362 |
| 7,455,361 B2 * | 11/2008 | Stemmer et al. | 297/362 |
| 7,461,900 B2 * | 12/2008 | Lange | 297/362 X |
| 7,484,806 B2 * | 2/2009 | Ito et al. | 297/362 |
| 7,497,519 B2 * | 3/2009 | Dill et al. | 297/362 |
| 7,513,573 B2 * | 4/2009 | Wahls et al. | 297/362 |
| 7,520,568 B2 * | 4/2009 | Hoshihara et al. | 297/362.11 X |
| 7,544,142 B2 * | 6/2009 | Schuler et al. | 297/362.11 X |
| 7,607,737 B2 * | 10/2009 | Liebich et al. | 297/362 |
| 7,648,203 B2 * | 1/2010 | Voss et al. | 297/362 |
| 7,726,743 B2 * | 6/2010 | Smith et al. | 297/362 |
| 7,731,289 B2 * | 6/2010 | Matsumoto et al. | 297/362 |
| 7,753,450 B2 * | 7/2010 | Eppert et al. | 297/362 |
| 7,789,464 B2 * | 9/2010 | Stemmer et al. | 297/362 |
| 7,878,593 B2 * | 2/2011 | Nae | 297/362 |
| 7,878,594 B2 * | 2/2011 | Fukuzawa et al. | 297/362 |
| 7,997,655 B2 * | 8/2011 | Sakai et al. | 297/362.11 |
| 8,033,606 B2 * | 10/2011 | Mitsuhashi | 297/362 |

FOREIGN PATENT DOCUMENTS

JP    2004-187759    7/2004

* cited by examiner

Enlarged view of portion A

SEAT RECLINING APPARATUS FOR VEHICLE

CROSS REFERENCE TO RELATED APPLICATIONS

This application is based on and claims priority under 35 U.S.C. §119 to Japanese Patent Application 2009-0138567, filed on Jun. 9, 2009, the entire content of which is incorporated herein by reference.

TECHNICAL FIELD

This disclosure relates to a seat reclining apparatus for a vehicle, adjusting a tilt angle of a seat back of the vehicle.

BACKGROUND DISCUSSION

A known seat reclining apparatus for a vehicle disclosed in JP2001-340154A (hereinafter referred to as Reference 1, see paragraphs 0010 to 0013, FIGS. 2 to 4) is attached to a seat cushion. The seat reclining apparatus includes a lower arm attached to a seat cushion, an upper arm attached to a seat back, first and second wedge members, a spring arranged between the first and second wedge members, and a drive shaft driving the first and second wedge members to rotate relative to the lower arm. The lower arm includes an internal gear and a first circumferential portion formed coaxially with the internal gear and having an outer circumferential surface. The outer circumferential surface of the first circumferential portion has a small diameter. The upper arm includes an external gear and a second circumferential portion having an inner circumferential surface. The inner circumferential surface of the second circumferential portion has a large diameter that is larger than the small diameter of the outer circumferential surface of the first circumferential portion. The number of teeth of the external gear of the upper arm is less than the number of teeth of the internal gear of the lower arm. The first and second wedge members are accommodated in a crescent-shaped accommodating space formed between the second circumferential portion and the first circumferential portion contacting the second circumferential portion. The wedge members frictionally engage with and disengage from the first and second circumferential portions. Further, the spring consistently biases the first and second wedge members in a direction engaging the first and second wedge members with the first and second circumferential portions.

In the seat reclining apparatus configured as above, when the drive shaft rotates, one of the first and second wedge members is moved against a biasing force of the spring and the other of the first and second wedge members is moved and pressed in the same direction of the movement of one of the first and second wedge members. Thus, the first and second wedge members are rotated relative to the lower arm to sequentially change an engagement position between the internal gear of the lower arm and the external gear of the upper gear accordingly. As a result, the upper arm is rotated relative to the lower arm depending on a difference between the teeth of the external gear and the teeth of the internal gear; therefore an angle of the upper arm relative to the lower arm is adjusted.

In addition, a seat reclining apparatus for a vehicle disclosed in JP2004-187759A (hereinafter referred to as Reference 2, see paragraphs 0017 to 0019, FIG. 4, and FIG. 9) has the approximately similar configuration to the configuration of the seat reclining apparatus described in Reference 1. The seat reclining apparatus described in Reference 2 is different from that of Reference 1 in that the first and second wedge members have finned portions, respectively. The finned portions are configured so as to be contactable with an axial end face of a cylinder portion that is formed on either one of the internal gear and the external gear and that supports therein the drive shaft to be rotatable. When a load is applied to either one of the internal gear and the external gear, the first and second wedge members may tilt relative to the cylindrical portion. At this time, the finned portions make contact with the axial end face of either one of the internal gear and the external gear to prevent the tilt movement of the first and second wedge members. As a result, the seat reclining apparatus smoothly operates without a variation of the engagement position between the external gear and the internal gear.

In References 1 and 2 described above, in the case where a tilt angle of the seat back is adjusted by the seat reclining apparatus and the seat back reclining apparatus is operated again in order to readjust the tilt angle of the seat back after a long period of time elapses following the previous adjustment of the tilt angle, i.e. after respective circumferential contact surfaces of the first and second wedge members are maintained in frictional contact with the inner circumferential surface of the second circumferential portion of the upper arm for a long period of time, a noise may occur only at an initial stage of the re-operation of the seat reclining apparatus. A reason of the occurrence of the noise is as follows.

When the respective circumferential contact surfaces of the first and second wedge members are pressed against the inner circumferential surface of the second circumferential portion of the upper arm under a high contact surface pressure, a lubricant such as grease applied to the circumferential contact surfaces is removed or released therefrom. At this time, even when the first and second wedge members are required to move after a long period of time while the circumferential contact surface is maintained without the lubricant, the first and second wedge members do not move until a certain degree of torque is applied to the first and second wedge members. This is because of a large static frictional force between the circumferential contact surfaces of the first and second wedge members and the inner circumferential surface of the second circumferential portion of the upper arm. When the torque to be applied to the first and second wedge members exceeds a predetermined value, the first and second wedge members suddenly start moving and therefore cause the noise between the circumferential contact surfaces of the first and second wedge members and the inner circumferential surface of the second circumferential portion.

A need thus exists for a seat reclining apparatus for a vehicle, which is not susceptible to the drawback mentioned above.

SUMMARY

According to an aspect of this disclosure, a seat reclining apparatus for a vehicle includes a first arm adapted to be supported by one of members respectively arranged at a seat cushion and a seat back of a seat, a second arm adapted to be supported by the other of the members respectively arranged at the seat cushion and the seat back of the seat, an internal gear formed at the first arm, an external gear formed at the second arm and engaging with the internal gear that is formed at the first arm, the external gear including at least one fewer teeth than the internal gear of the first arm, a first circumferential portion formed coaxially with the internal gear at the first arm, a second circumferential portion formed coaxially with the external gear at the second arm, first and second wedge members accommodated in an accommodating space formed between the first circumferential portion and the second circumferential portion under a condition where one of the first circumferential portion and the second circumferential portion eccentrically contacts the other of the first circumferential portion and the second circumferential portion so that the internal gear and the external gear engage with each other, each of the first and second wedge members including a pressure portion pressed by the one of the first circumferential portion and the second circumferential portion and a circumferential contact surface frictionally contacting the other of the first circumferential portion and the second circumferential portion to thereby bring the first and second wedge members into a wedged state, a spring arranged between the first and second wedge members and biasing the first and second wedge members in a direction toward first and second ends of the accommodating space, respectively, to thereby realize the wedged state, a drive shaft rotatably driven by a drive unit around a rotation axis of either one of the first arm and the second arm, the drive shaft moving one of the first and second wedge members in a direction away from one of the first and second ends of the accommodating space depending on a rotation direction of the drive unit in order to release the wedged state of the one of the first and second wedge members and pressing the other of the first and second wedge members into the other of the first and second ends of the accommodating space to move one of the internal gear and the external gear eccentrically relative to the other of the internal gear and the external gear to thereby rotate the second arm relative to the first arm depending on a difference of the number of teeth between the internal gear and the external gear, and a retention groove retaining a lubricant and formed on the circumferential contact surface of the each of the first and second wedge members frictionally contacting the other of the first circumferential portion and the second circumferential portion, the retaining groove extending along a direction of the rotation axis of either one of the first arm and the second arm.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
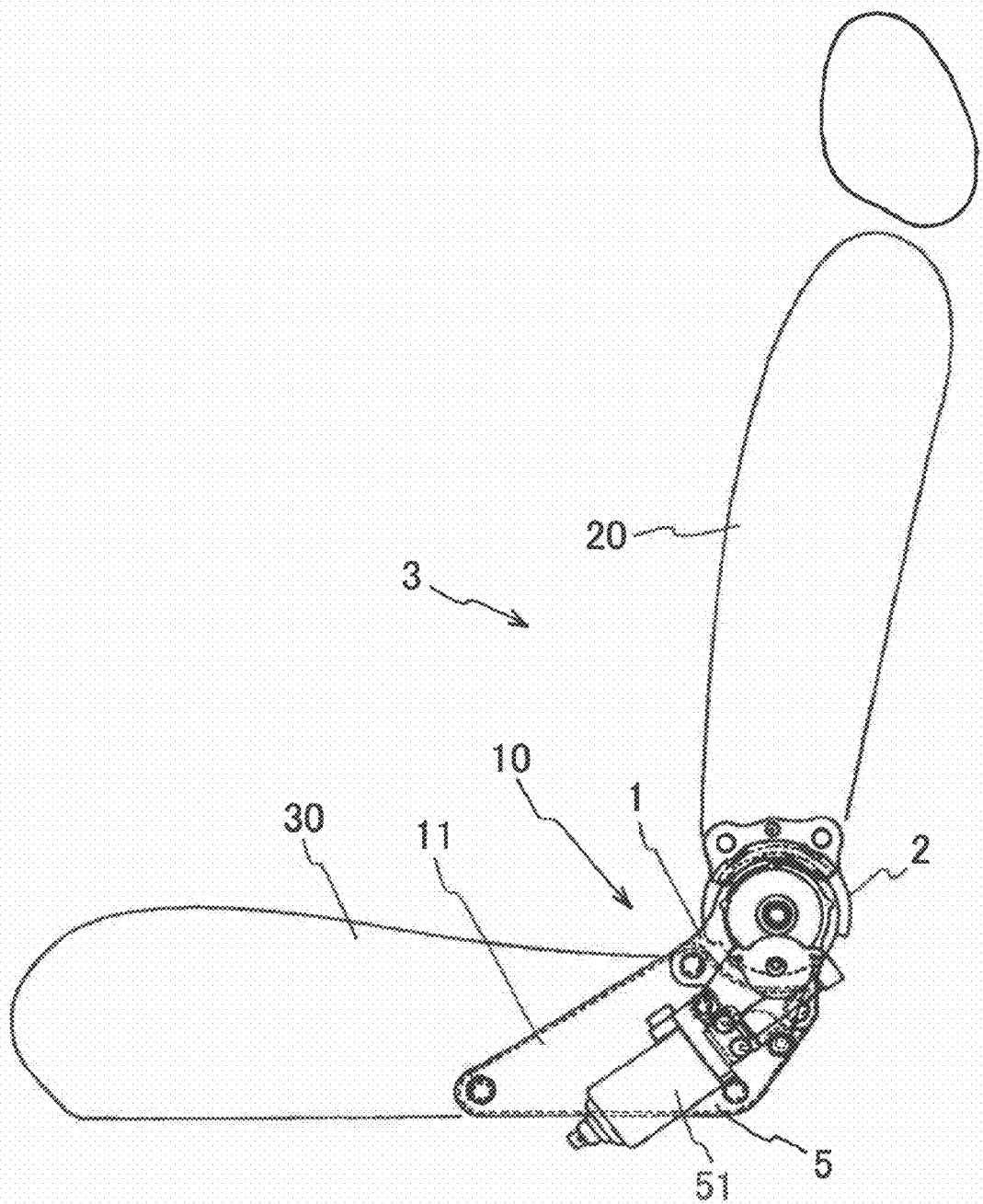
FIG. 1 is a lateral view of a seat to which a seat reclining apparatus for a vehicle according to a first embodiment disclosed here is attached.

A seat reclining apparatus 10 for a vehicle of a first embodiment will be explained with reference to illustrations of drawings as follows. As illustrated in FIG. 1, the seat reclining apparatus 10 adjusts a tilt angle of a seat back 20 relative to a seat cushion 30. In the first embodiment, the seat reclining apparatuses 10 having approximately symmetrical configurations are attached to both sides of a seat 3 of the vehicle in the width direction thereof. The seat reclining apparatuses 10 are connected to each other by an interlock shaft 8 described below. A drive unit 5 including a motor 51 is attached to one of the seat reclining apparatuses 10. The seat reclining apparatus 10 including the motor 51 operates in conjunction with the other seat reclining apparatuses 10 not including the drive unit 5. The operation and configuration of the seat reclining apparatus 10 having the drive unit 5 will be mainly described hereinafter.

As shown in FIGS. 1 to 4, the seat reclining apparatus 10 includes a lower arm 11 (first arm), a gear plate 1 (first arm), an upper arm (second arm) 2, an internal gear 12 arranged at the lower arm 11, an external gear 22 arranged at the upper arm 2, first and second wedge members 7a and 7b, a spring 9, and a drive shaft 6. The lower arm 11 is fixed to a seat cushion frame to which the seat cushion 30 is fixed with bolts that penetrate through attachment holes 11a. The gear plate 1 is fixably attached to the lower arm 11 by means of two pins 11b. A shaft hole 14 into which the drive shaft 6 described below penetrates is formed in the approximately center of the gear plate 1. A burring portion 13 serving as a first circumferential portion is formed on a circular rim of the shaft hole 14 so as to extend vertically thereon in a cylindrical shape coaxially with the shaft hole 14 (with the drive shaft 6). An outer circumferential surface 13a of the burring portion 13 is set to have a diameter smaller than an inner circumferential surface 25a of a burring portion 25 (second circumferential portion) of the upper arm 2 described below and an inner circumferential surface 23a of a press-fit ring 23. Further, the internal gear 12 is formed at the gear plate 1 by a half blanking pressing process so as to be coaxial with the burring portion 13. A space 15 is formed at an inner circumferential side of the internal gear 12. Further, the external gear 22 formed at the upper arm 2 is fitted in the space 15 so as to therein engage with the internal gear 12.

As illustrated in FIGS. 1 to 4, the upper arm 2 is fixed to a seat back frame to which the seat back 20 is fixed by means of bolts penetrating through attachment holes 2a. An axis hole 24 is formed in the approximately center of the upper arm 2. The burring portion 25 serving as the second circumferential portion is formed on a circular rim of the axis hole 24 so as to extend vertically thereon in a cylindrical shape coaxially with the axis hole 24. Further, the press-fit ring 23 is press-fitted into the axis hole 24 so as to be coaxial with the burring portion 25. The press-fit ring 23 includes an outer circumferential surface 23b having the same shape as the inner circumferential surface 25a of the burring portion 25 and serves as the second circumferential portion. As described above, the inner circumferential surface 25a of the burring portion 25 and the inner circumferential surface 23a of the press-fit ring 23 have diameters, respectively, larger than the outer circumferential surface 13a of the burring portion 13.

Moreover, the external gear 22 is formed in the upper arm 2 by the half blanking pressing process so as to be coaxial with the burring portion 25 and the press-fit ring 23. The number of teeth of the external gear 22 of the upper arm 2 is set to be slightly less than the number of teeth of the internal gear 12 of the gear plate 1. A portion (an upper side seen in FIG. 5) of the teeth of the external gear 22 of the upper arm 2 engages with a portion of the teeth of the internal gear 12 of the gear plate 1. An engagement position between the internal gear 12 and the external gear 22 is maintained by actions of the first and second wedge members 7a and 7b and the spring 9 as will be described below.

Figure 4:
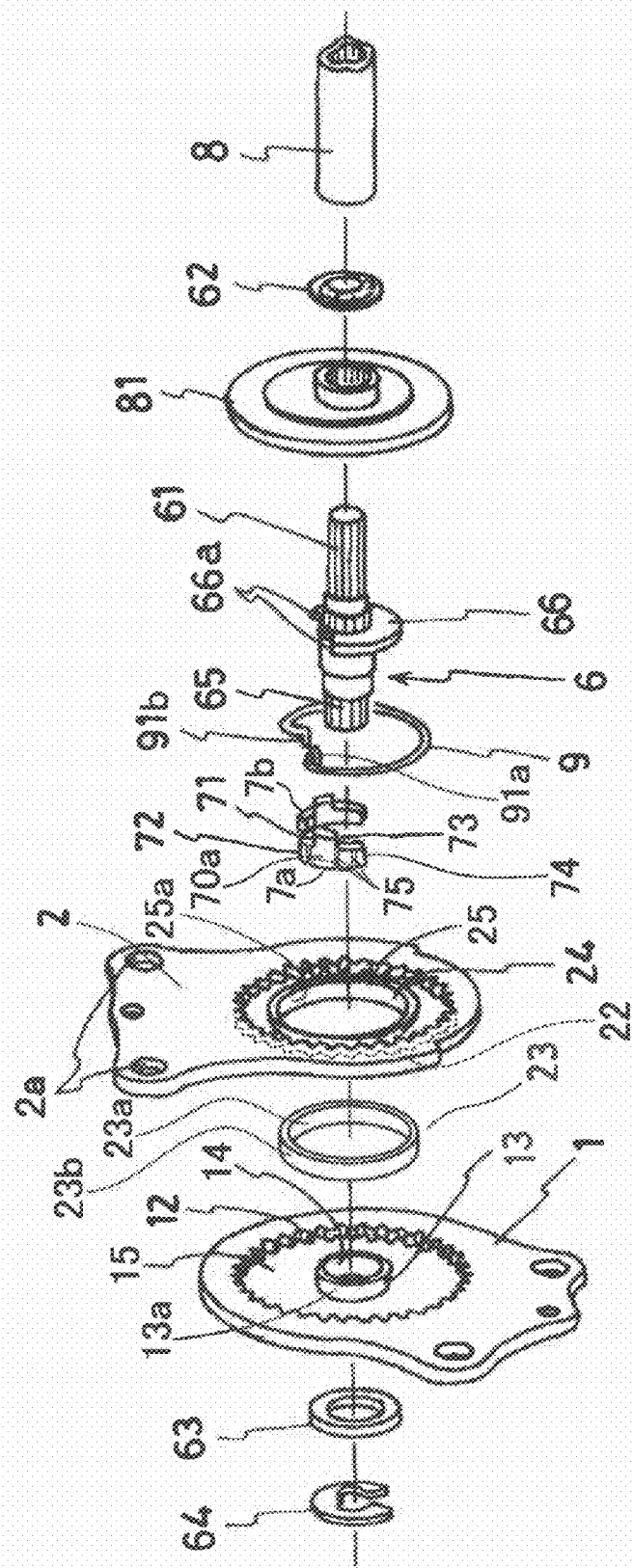
FIG. 4 is an exploded perspective view of the seat reclining apparatus according to the first embodiment disclosed here.
Figure 5:
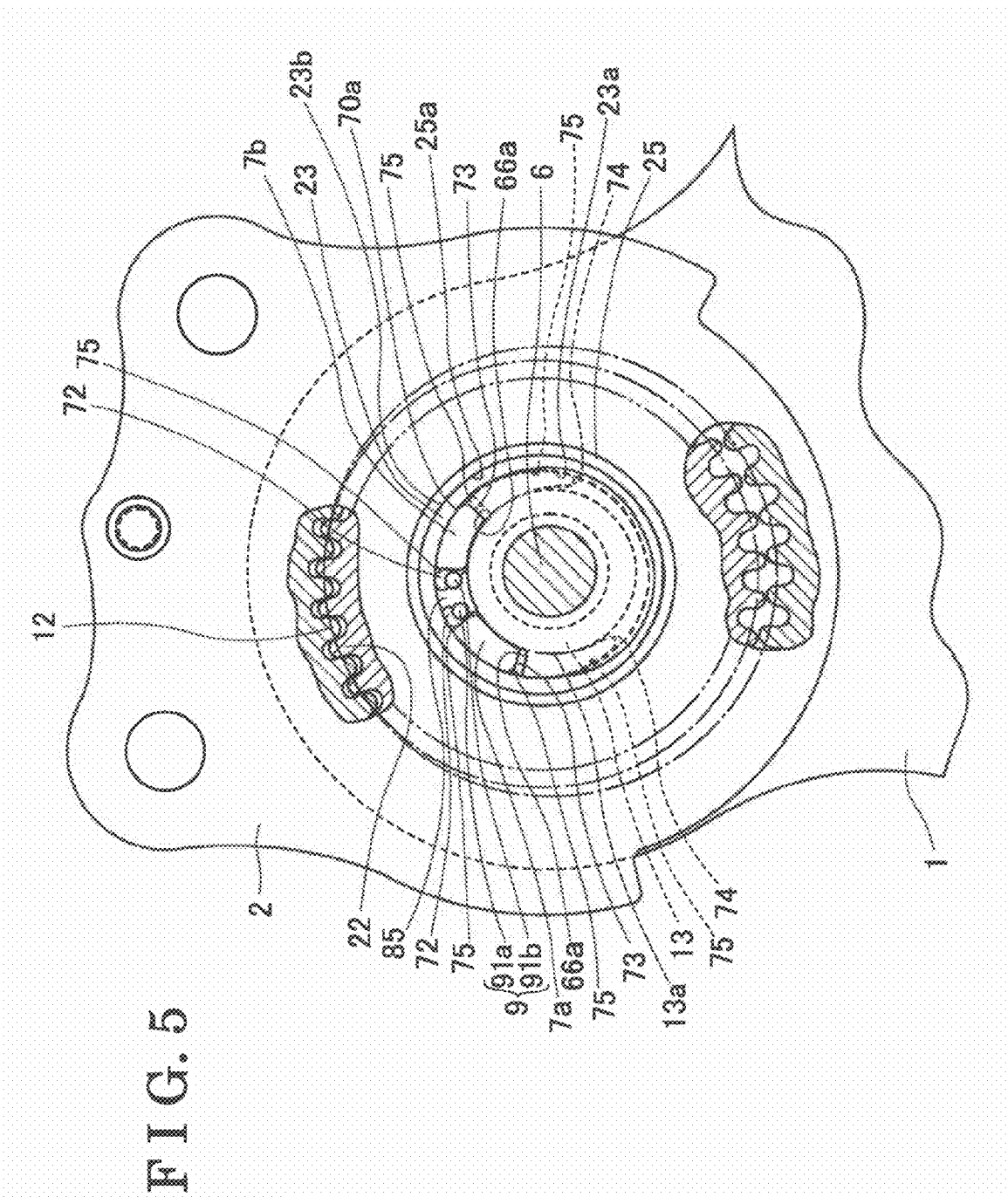
FIG. 5 is a cross-sectional view taken along the line V-V of FIG. 3.

As illustrated in FIG. 4, the first and second wedge members 7a and 7b include curved shapes symmetrically cut from an approximately ring-shaped member relative to a diameter thereof. Each of the first and second wedge members 7a and 7b is formed into a wedge having a thickness gradually decreasing in the circumferential direction. As shown in FIG. 5, the first and second wedge members 7a and 7b are accommodated in an approximately crescent-shaped accommodating space formed between the outer circumferential surface 13a of the burring portion 13 and the inner circumferential surface 23a of the press-fit ring 23 under a condition where the outer circumferential surface 13a eccentrically contacts the inner circumferential surface 23a so that the internal gear 12 and the external gear 22 engage with each other. The first wedge member 7a includes a large-thickness end portion 72 and a small-thickness end portion 74 while the second wedge member 7b includes the large-thickness end portion 72 and the small-thickness end portion 74. The first and second wedge members 7a and 7b are arranged in the crescent-shaped accommodating space so as to cover an approximately half range of the outer circumferential surface 13a of the burring portion 13. Further, the large-thickness end portions 72 of the first and second wedge members 7a and 7b face each other in a space 85 defined therebetween. The spring 9 acting to expand the space 85 is arranged in the space 85. The spring 9 includes a first end 91a locked at the large-thickness end portion 72 of the first wedge member 7a and a second end 91b locked at the large-thickness end portion 72 of the second wedge member 7b.

Figure 6A:
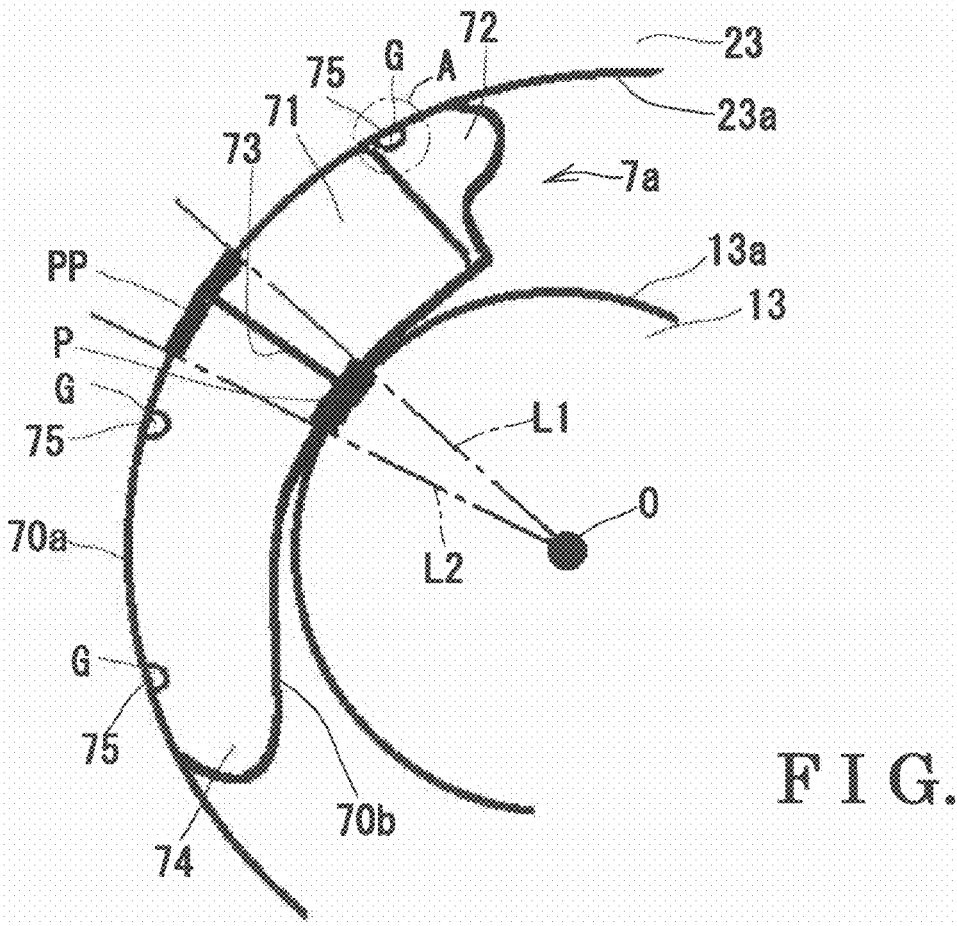
FIG. 6A is an enlarged sectional view of a wedge member of the seat reclining apparatus according to the first embodiment disclosed here.

The first and second wedge members 7a and 7b will be further explained as follows. Since the first and second wedge members 7a and 7b have the same configuration except that they are symmetric to each other, only the first wedge member 7a will be described hereinafter. As illustrated in FIG. 6A, the first wedge member 7a has an outer peripheral surface 70a (circumferential contact surface) frictionally contactable with the inner circumferential surface 23a of the press-fit ring 23 and an inner peripheral surface 70b having a pressure portion P. The pressure portion P is formed on a portion of the inner peripheral surface 70b so as to be pressed by the outer circumferential surface 13a of the burring portion 13. That is, the outer peripheral surface 70a serves as the circumferential contact surface having a circular arc, the whole area of which is uniformly contactable with the inner circumferential surface 23a of the press-fit ring 23. A small clearance is formed between the outer circumferential surface 13a of the burring portion 13 and the inner peripheral surface 70b. A wedge surface of the inner peripheral surface 70b is configured so as to reduce the clearance toward the large-thickness end portion 72, axially contact the outer circumferential surface 13a at the pressure portion P, and increase the clearance toward the large-thickness end portion 72 in the circumferential direction of the first wedge member 7a.

The pressure portions P of the first and second wedge members 7a and 7b are pressed by the outer circumferential surface 13a of the burring portion 13 under the condition where the first and second wedge members 7a and 7b are accommodated in the crescent-shaped accommodating space formed between the outer circumferential surface 13a of the burring portion 13 and the inner circumferential surface 23a of the press-fit ring 23. As a result, the circumferential contact surfaces (outer peripheral surfaces 70a) of the first and second wedge members 7a and 7b are brought into frictional contact with the inner circumferential surface 23a and wedged therewith. Thus, a wedge effect of the first wedge member 7a is fully exerted by the contact between the inner peripheral surface 70b of the first wedge member 7a and the outer circumferential surface 13a of the burring portion 13. Further, the whole outer peripheral surface 70a of the first wedge member 7a is brought into uniform contact with the inner circumferential surface 23a of the press-fit ring 23 to thereby uniform a stress distribution on the outer peripheral surface 70a. In addition, the first wedge member 7a is configured so as to have the inner peripheral surface 70b contactable with the outer circumferential surface 13a at a point or so as to have a small wedge surface contactable with the outer circumferential surface 13a; thereby the wedge effect of the first wedge member 7a may be fully exerted.

As described above, the space 85 is increased by the action of the spring 9 to therefore realize the wedge effect of the first wedge member 7a and move the press-fit ring 23 (the upper arm 23) upward in FIG. 5. Accordingly, the portion of the teeth of the external gear 22 of the upper arm 2 (upper side in FIG. 5) is strongly pressed against the portion of the teeth of the internal gear 12 of the gear plate 1. Consequently, the engagement between the external gear 22 and the internal gear 12 is surely maintained without displacement. For example, a noise may occur between the first wedge member 7a and the press-fit ring 23 when the seat reclining apparatus 10 is operated after the engagement between the external gear 22 and the internal gear 12 is maintained for a long period of time. However, retention grooves 75 (three retention grooves 75 applied in the first embodiment) retaining a lubricant G such as grease are formed on the outer peripheral surface 70a of the first wedge member 7a so as to extend along a direction of a rotation axis of the drive shaft 6 in order to prevent the aforementioned noise.

Thus, even when the frictional contact between the outer peripheral surface 70a of the first wedge member 7a and the inner circumferential surface 23a of the press-fit ring 23 is maintained under a high contact surface pressure for a long period of time, the lubricant G is retained in the retention grooves 75 configured as described above. Accordingly, even when the seat reclining apparatus 10 is operated after the friction contact between the outer peripheral surface 70a and the inner circumferential surface 23a is maintained under the high contact surface pressure for a long period of time, the lubricant G retained in the retention grooves 75 is quickly supplied over the outer peripheral surface 70a of the first wedge member 7a to reduce a static frictional force between the outer peripheral surface 70a of the first wedge member 7a and the inner circumferential surface 23a of the press-fit ring 23. As a result, the first wedge member 7a is moved within the press-fit ring 23 right after the seat reclining apparatus 10 is operated; therefore, the noise between the outer peripheral surface 70a and the press-fit ring 23 is certainly prevented.

Moreover, the area of the outer peripheral surface 70a of the first wedge member 7a is larger than the area of the inner peripheral surface 70b and therefore is more appropriate as the circumferential contact surface than the inner peripheral surface 70b. Accordingly, a contact surface pressure per unit area of the outer peripheral surface 70a, which is applied by a pressure applied to the inner peripheral surface 70b, is small. In addition, in the case where the frictional contact between the outer peripheral surface 70a of the first wedge member 7a and the inner circumferential surface 23a of the press-fit ring 23 is maintained for a long period of time, the lubricant G retained in the retention grooves 75 formed on the outer peripheral surface 70a is quickly supplied over the outer peripheral surface 70a at the timing of a re-operation of the seat reclining apparatus 10. As a result, the noise between the first wedge member 7a and the press-fit ring 23 is surely inhibited.

Figure 6B:
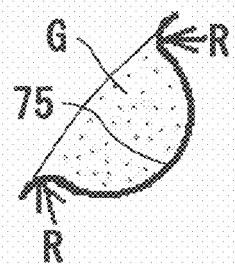
FIG. 6B is an enlarged view of a portion A of the wedge member shown in FIG. 6B.

A plurality of retention grooves 75 (two or more retention grooves 75) is appropriately formed on the outer peripheral surface 70a of the first wedge member 7a so as to extend along the direction of the rotation axis perpendicular to the circumferential direction corresponding to a moving direction of the first wedge member 7a. Further, as shown in FIG. 6B illustrating an enlarged view of a portion A shown in FIG. 6B, each of the retention grooves 75 has a circular arc shape in cross-section and both ends of the retention groove 75 are appropriately round-chamfered. The outer peripheral surface 70a of the first wedge member 7a slides on the inner circumferential surface 23a of the press-fit ring 23; thereby the lubricant G retained in the retention grooves 75 is uniformly and smoothly supplied between the outer peripheral surface 70a and the inner circumferential surface 23a. Because the both ends of the retention groove 75 are round-chamfered, the area of the outer peripheral surface 70a is reduced, therefore increasing the contact surface pressure per unit area of the outer peripheral surface 70a relative to the inner circumferential surface 23a. However, the lubricant G is easily supplied over the outer peripheral surface 70a by the round-chamfered both ends of the retention groove 75, therefore reducing the static frictional force between the outer peripheral surface 70a and the inner circumferential surface 23a.

For example, a stress is concentrated on the pressure portion P of the inner peripheral surface 70b of the first wedge member 7a by a large load inputted at the time of a collision of the vehicle. An area PP in an extended position from the pressure portion P toward a radially outward direction of the drive shaft 6 and overlapping the circumferential contact surface (outer peripheral surface 70a) is regarded as a stress concentration area of the outer peripheral surface 70a. Formed on the stress concentration area, the retention grooves 75 may lead to a deterioration of the strength of the first wedge member 7a and may damage the first wedge member 7a accordingly. However, when the retention grooves 75 are formed on the outer peripheral surface 70a without overlapping the stress concentration area, the damage of the first wedge member 7a is prevented.

That is, the area PP is defined by drawing two lines, dashed lines L1 and L2 (shown in FIG. 6) drawn from a center point "O" of the drive shaft 6 so as to linearly pass through both ends of the pressure portion P toward the outer peripheral surface 70a, respectively, of each of the first and second wedge members 7a and 7b. The area PP overlapping the outer peripheral surface 70a conforms to the stress concentration area due to the aforementioned large load. The retention grooves 75 are not formed in the area PP of the outer peripheral surface 70a but in an area of the outer peripheral surface 70a, which does not include the area PP, so that none of the retention grooves 75 is arranged in the stress concentration area due to the large load. Accordingly, the deterioration of the strength of the first wedge member 7a is prevented and the damage of the first wedge member 7a due do the large load is inhibited.

Figure 3:
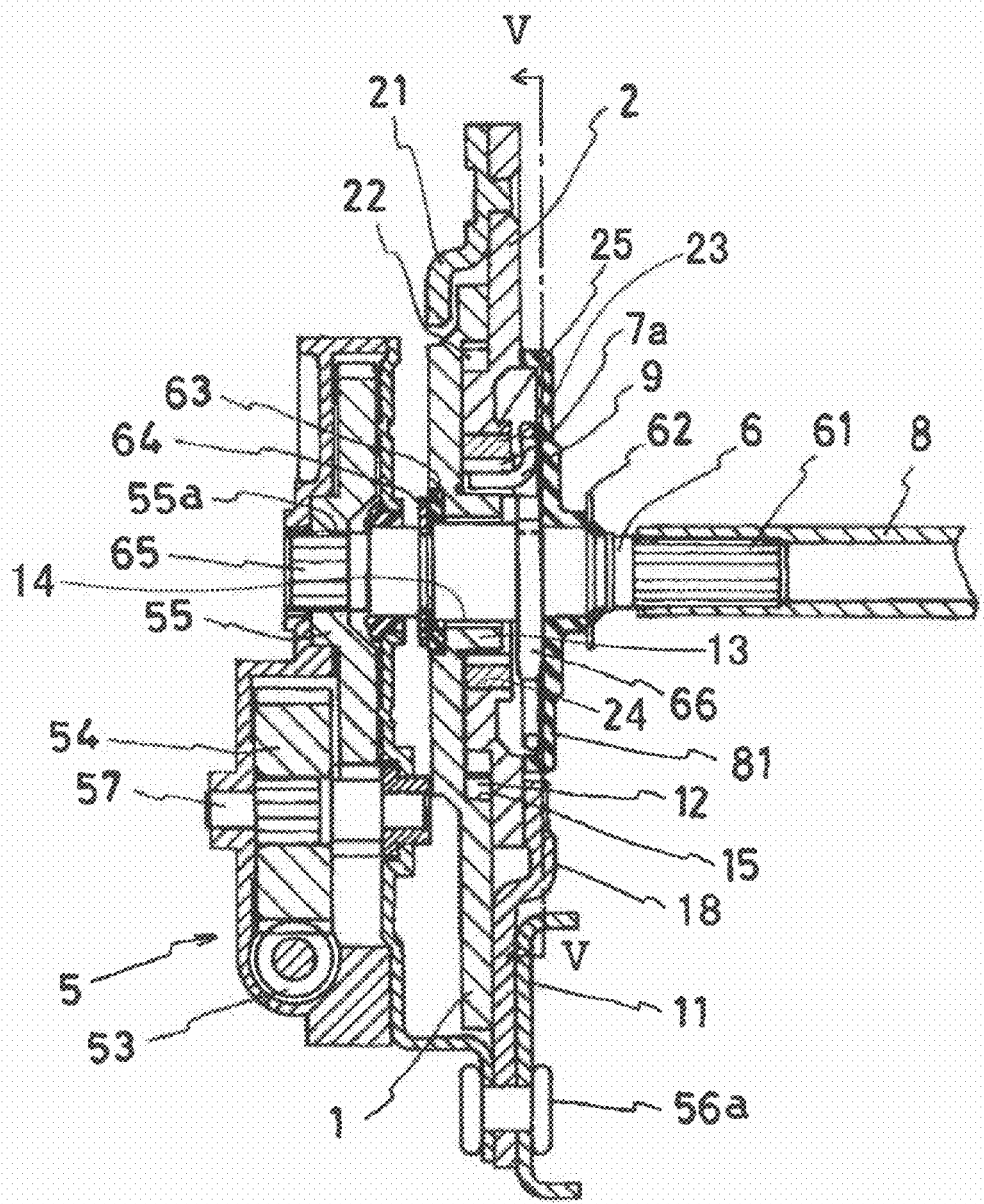
FIG. 3 is a cross-sectional view taken along the line III-III of FIG. 2.

As shown in FIG. 3 and FIG. 4, the drive shaft 6 penetrates through the shaft hole 14 of the gear plate 1 so as to be rotatable. A cam portion 66 is formed in an approximately intermediate portion in a longitudinal direction of the drive shaft 6. A circular plate is cut so as to be radially opened and partially notched, thereby forming a sector disc serving as the cam portion 66. Further, a protruding portion 71 is formed on each of end faces of the first and second wedge members 7a and 7b so as to protrude further from the burring portion 25 of the upper arm 2 and an end face of the press-fit ring 23 along the direction of the rotation axis. Furthermore, when the drive shaft 6 rotates in a first direction, one of end faces 66a of the notched portion of the cam portion 66 makes contact with an end face 73 of the protruding portion 71 of either one of the first and second wedge members 7a and 7b; thereby the cam portion 66 moves one of the first and second wedge members 7a and 7b against a biasing force of the spring 9 so as to reduce the space 85 between the first and second wedge members 7a and 7b. Meanwhile, when the drive shaft 6 rotates in a second direction oppositely from the first direction, the cam portion 66 moves the other of the first and second wedge members 7a and 7b so as to similarly reduce the space 85 between the first and second wedge members 7a and 7b.

The sector disc of the cam portion 66 is formed so as to have an outer shape covering end faces of the first and second wedge members 7a and 7b, which do not include the protruding portions 71 of the first and second wedge members 7a and 7b. Accordingly, when an excessively large load is applied to the seat reclining apparatus 10 from the seat back 2 and thereafter acts on the first and second wedge members 7a and 7b, the first and second wedge members 7a and 7b are prevented from being dislocated from respective predetermined positions thereof. In addition, the protruding portions 71 are respectively formed on the end faces of the first and second wedge members 7a and 7b so as to be contactable with the cam portion 66 formed by the sector disc partially notched from the circular plate. Thus, the drive shaft 6 including the cam portion 66 is easily manufactured by means of deformation processing applied to steel materials.

Figure 2:
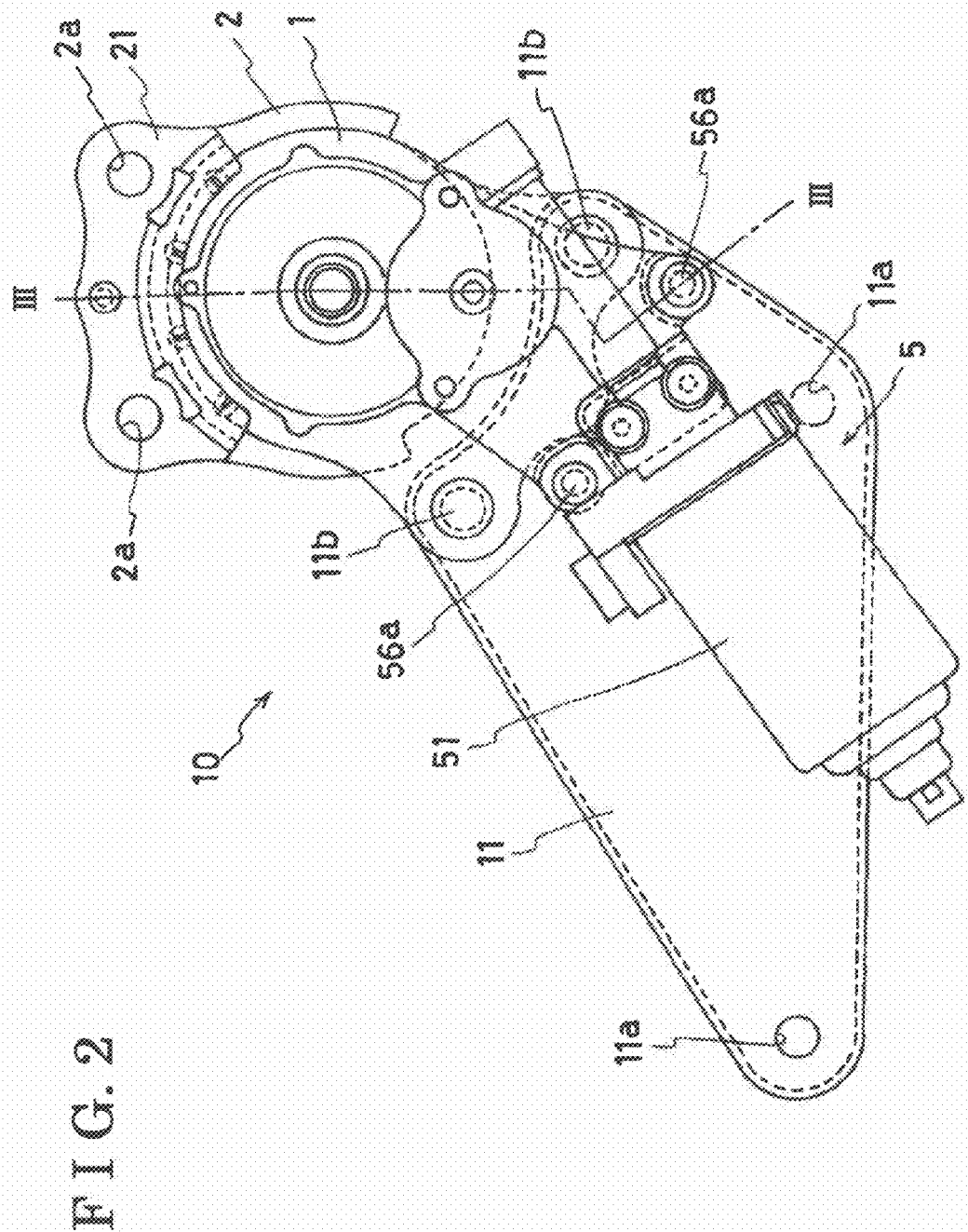
FIG. 2 is a lateral view of the seat reclining apparatus according to the first embodiment disclosed here.

As illustrated in FIGS. 2 to 4, serrated portions 61 and 65 are formed respectively at first and second end portions of the drive shaft 6. Each of the serrated portions 61 and 65 has multiple serrated grooves in the direction of the rotation axis. The drive unit 5 is attached on the lower arm 11 with pins 56a. The drive unit 5 includes a reduction gear mechanism having the motor 51 used as source of power, a worm gear shaft 53, a worm wheel 54, a pinion gear 57, and a gear 55 serving as a final gear. Rotation of the motor 51 is finally transmitted to the gear 55. The gear 55 has a serrated portion in the center, which engages with the serrated portion 65 of the drive shaft 6. The motor 51 is configured so as to rotate in positive and negative directions when an operation switch is operated by an occupant of the vehicle.

As illustrated in FIG. 3 and FIG. 4, in order to realize an assembled state of the seat reclining apparatus 10 configured as described above, a stop ring 64 is locked on a groove on a circumferential surface at the second end portion of the drive shaft 6 adjacent to the gear plate 1, via a washer 63. Further, a cover 81 pressing the spring 9 is attached to the first end portion of the drive shaft 6 adjacent to the upper arm 2 so as to be locked with a stop ring 62. Furthermore, pressing plate members 21 and 18 are attached to the upper arm 2 and the gear plate 1, respectively. The upper arm 2 and the gear plate 1 are sandwiched by the pressing plate members 21 and 18 therebetween in order to prevent the gear plate 1 and the upper arm 2 from being axially disengaged from each other when the excessively large load is applied to the seat reclining apparatus 10. A first end portion of the interlock shaft 8 is fitted to the serrated portion 61 of the drive shaft 6 provided on one of the both sides of the seat 3 in the width direction thereof and a second end portion of the interlock shaft 8 is fitted to a serrated portion formed at the seat reclining apparatus 10 provided on the other of the both sides of the seat 3 in the width direction. Thus, a driving force of the drive unit 5 is transmitted to the seat reclining apparatus 10 provided on the other of the both sides of the seat 3 in the width direction thereof.

A tilt angle adjustment operation of the seat reclining apparatus 10 will be described as follows. As illustrated in FIG. 5, while the drive shaft 6 is not rotated, the wedge members 7a and 7b are biased in a direction separating from each other toward first and second ends of the crescent-shaped accommodating space. Accordingly, the pressure portions P of the inner peripheral surfaces 70b of the first and second wedge members 7a and 7b, respectively, are strongly and radially outwardly pressed by the outer circumferential surface 13a of the burring portion 13 and the outer peripheral surfaces 70a (circumferential contact surfaces) of the first and second wedge members 7a and 7b, respectively, are strongly pressed against the inner circumferential surface 23a of the press-fit ring 23 to make frictional contact therewith. Thus, the first and second wedge members 7a and 7b and the press-fit ring 23 are restricted from rotating relative to the gear plate 1 to thereby maintain the engagement position between the external gear 22 of the upper arm 2 and the internal gear 12 of the gear plate 1 in the predetermined position.

Next, when the occupant operates the operation switch to drive the motor 51 to rotate in the first direction, the rotation (torque) of the motor 51 is transmitted to the drive shaft 6 via the reduction gear mechanism. When the drive shaft 6 rotates in a clockwise direction seen in FIG. 5, the end face 66a of the cam portion 66 to the left makes contact with the end face 73 of the protruding portion 71 of the first wedge member 7a serving as a driving portion and the first wedge member 7a is moved in a direction away from the left side (first end) of the crescent-shaped accommodating space in order to release a wedged state of the first wedge member 7a. When the movement of the first wedge member 7a occurs after the engagement position between the external gear 22 and the internal gear 12 is maintained for a long period of time, the noise may occur between the first wedge member 7a and the fit-ring member 23. However, the lubricant G retained in the retention grooves 75 formed on the outer peripheral surface 70a of the first wedge member 7a is quickly supplied over the outer peripheral surface 70a at the time of the movement of the first wedge member 7a. Accordingly, the static frictional force between the outer peripheral surface 70a of the first wedge member 7a and the inner circumferential surface 23a of the press-fit ring 23 is reduced to certainly prevent the occurrence of the noise.

Thereafter, the first wedge member 7a serving as the driving portion is rotated around the rotation axis of the drive shaft 6 against the biasing force of the spring 9 so as to reduce the clearance 85 between the first wedge member 7a and the second wedge member 7b that serves as a driven portion. Thus, the wedged state of the first wedge member 7a at the left side of the crescent-shaped accommodating space in FIG. 5 is released to change the engagement position between the internal gear 12 and the external gear 22 accordingly. Then, the large-thickness end portion 72 of the first wedge member 7a serving as the driving portion makes contact with the large-thickness end portion 72 of the second wedge member 7b serving as the driven portion, thereby pressing the second wedge member 7b into the right side (second end) of the crescent-shaped accommodating space and thereafter rotating the second wedge member 7b about the rotation axis of the drive shaft 6. Alternatively, before the first wedge member 7a makes contact with the second wedge member 7b as described above, the second wedge member 7b is pressed into the right side of the crescent-shaped accommodating space by the biasing force of the spring 9 to thereby be rotated about the rotation axis of the drive shaft 6. That is, the first and second wedge members 7a and 7b are rotated around the rotation axis of the drive shaft 6 in the same rotation direction thereof (clockwise direction seen in FIG. 5).

The internal gear 12 of the gear plate 1 is arranged coaxially with the burring portion 13. The center of the internal gear 12 is on the direction of the rotation axis of the drive shaft 6. Further, the first and second wedge members 7a and 7b having the thickness gradually decreasing in the circumferential direction (having the large-thickness end portion 72 and the small-thickness end portion 74) are arranged between the burring portion 13 and the press-fit ring 23 positioned adjacent to the upper arm 2. Accordingly, the center (rotation axis) of the internal gear 12 of the gear plate 1 is eccentric relative to the center of the external gear 22 of the upper arm 2 so that the external gear 22 eccentrically moves relative to the internal gear 12. Consequently, the engagement position between the teeth of the external gear 22 and the teeth of the internal gear 12 changes. Further, the external gear 22 eccentrically moves relative to the center (rotation axis) of the internal gear 12 to sequentially change the engagement position. Furthermore, as the drive shaft 6 rotates 360 degrees, the upper arm 2 rotates relative to the gear plate 1 by an angle corresponding to a difference between the teeth of the external gear 22 and the teeth of the internal gear 12. Thus, the tilt angle of the seat back 20 relative to the seat cushion 30 is adjusted.

When the occupant operates the operation switch to stop the motor 51, the rotation of the drive shaft 6 stops to therefore stop the rotation of the cam portion 66. Ultimately, the rotation of the first wedge member 7a stops while the second wedge member 7b serving as the driven portion is further rotated by the biasing force of the spring 9 so as to increase the space 85 between the first and second wedge members 7a and 7b. Afterward, the drive shaft 6 slightly rotates in the opposite direction (counterclockwise direction) of the clockwise direction in FIG. 5 and the left side of the end face 66a of the cam portion 66 is moved away from the end face 73 of the protruding portion 71 of the first wedge member 7a. Then, the first and second wedge members 7a and 7b are moved in the direction separating from each other by the biasing force of the spring 9 to increase the space 85 accordingly. As a result, the movement of the first and second wedge members 7a and 7b stops due to the wedge effects of the respective outer peripheral surfaces 70a. Thus, the engagement position between the internal gear 12 and the external gear 22 is maintained in the predetermined position; thereby the upper arm 2 is locked with a predetermined angle relative to the gear plate 1. In addition, when the occupant operates the operation switch to rotate the motor 51 in the counterclockwise direction seen in FIG. 5, the drive shaft 6 similarly rotates in the counterclockwise direction to reverse the relation of the above drive and driven portions between the first and second wedge members 7a and 7b accordingly. That is, the first wedge member 7a serves as the driven portion and the second wedge member 7b serves as the driving portion.

Figure 7:
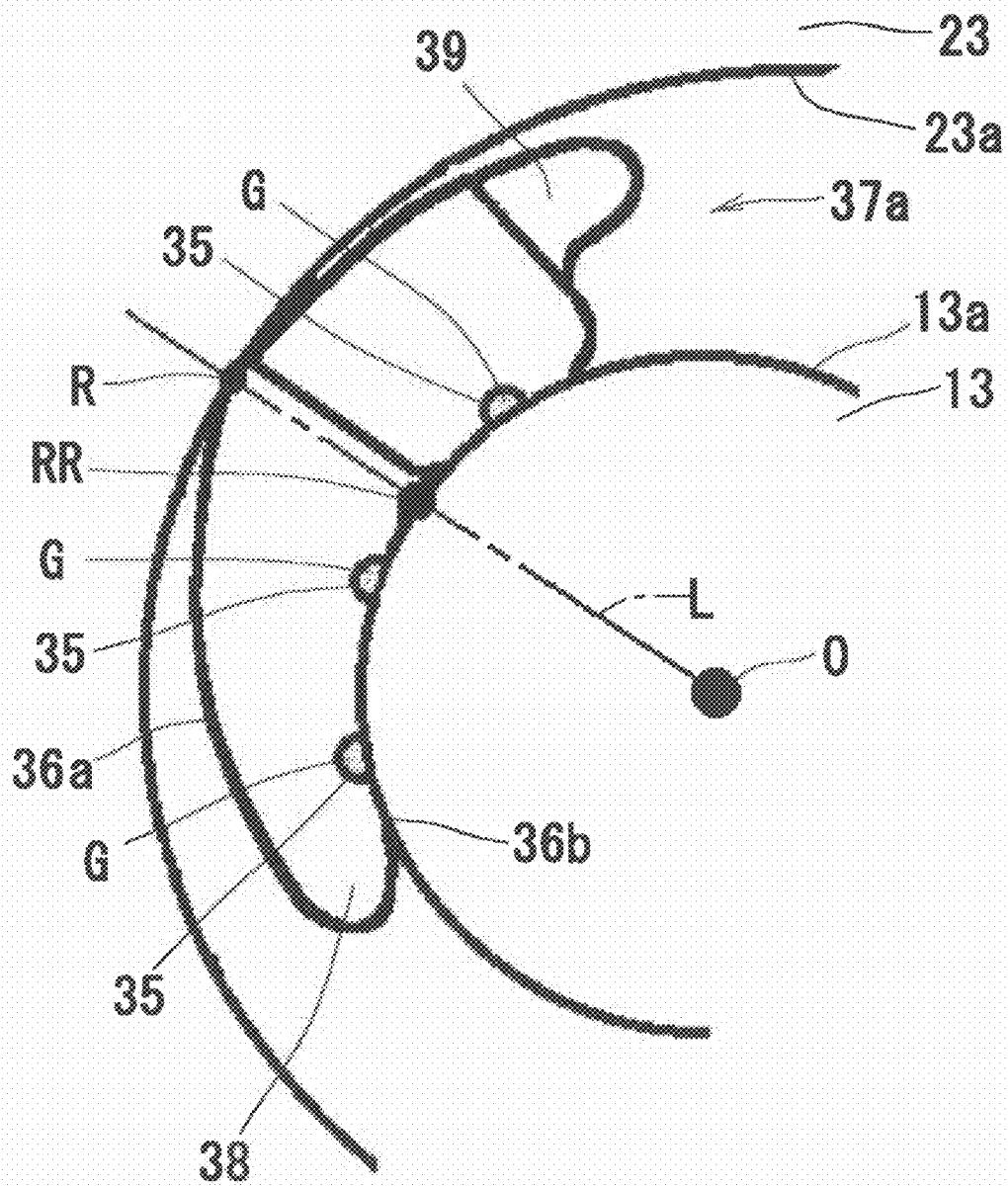
FIG. 7 is an enlarged sectional view of the wedge member of the seat reclining apparatus according to a second embodiment disclosed here.

The seat reclining apparatus 10 for a vehicle according to a second embodiment will be explained with reference to FIG. 7. In FIG. 7, one of first and second wedge members, i.e., a wedge member 37a, is only illustrated. However, the other of first and second wedge members has the same configuration except that the first and second wedge members are symmetrically formed. Thus, only the first wedge member 37a will be explained hereinafter. The wedge member 37a is formed into such a shape that a pressure portion R formed at a portion of an outer peripheral surface 36a of the wedge member 37a is pressed by the inner circumferential surface 23a of the press-fit ring 23 and that an inner peripheral surface 36b of the wedge member 37a is frictionally contactable with the outer circumferential surface 13a of the burring portion 13. The aforementioned configuration is the only difference from the first embodiment. Specifically, the outer peripheral surface 36a of the wedge member 37a forms a wedge surface so that a small clearance is defined in the vicinity of a small-thickness end portion 38 of the wedge member 37a relative to the inner circumferential surface 23a of the press-fit ring 23, and the clearance relative to the inner circumferential surface 23a decreases towards a large-thickness end portion 39. Then, the outer peripheral surface 36a axially makes contact with the inner circumferential surface 23a of the press-fit ring 23 at the pressure portion R and the clearance between the outer peripheral surface 36a and the inner circumferential surface 23a increases towards the large-thickness end portion 39. An inner peripheral surface 36b that serves as the circumferential contact surface of the wedge member 37a forms an arc surface as a whole so as to uniformly make contact with the outer circumferential surface 13a of the burring portion 13.

Accordingly, in a case where the drive shaft 6 is not rotated, the first wedge 37a is strongly pressed by the inner circumferential surface 23a of the press-fit ring 23 so as to frictionally make contact with the outer circumferential surface 13a of the burring portion 13. Thus, the engagement position between the internal gear 12 formed at the gear plate 1 and the external gear 22 formed at the upper arm 2 is appropriately maintained. Multiple retention grooves 35 (three retention grooves 35, for example) retaining the lubricant G such as grease are formed on the inner circumferential surface 36b of the wedge member 37a so as to extend along the direction of rotation axis of the drive shaft 6. Thus, even when the frictional contact between the inner circumferential surface 36b of the wedge member 37a and the outer circumferential surface 13a of the burring portion 13 is maintained under a high contact pressure for a long period of time, the lubricant G is retained in the retention grooves 35 configured as described above.

Accordingly, even when the seat reclining apparatus 10 is operated after the friction contact between the inner circumferential surface 36b of the wedge member 37a and the outer circumferential surface 13a of the burring portion 13 is maintained under the high contact pressure for a long period of time, the lubricant G retained in the retention grooves 35 is quickly supplied over the inner peripheral surface 36b of the wedge member 37a to reduce a static frictional force between the inner peripheral surface 36b of the wedge member 37a and the outer circumferential surface 13a of the burring portion 13. As a result, the wedge member 37a is pressed and moved on the burring portion 13 immediately after the seat reclining apparatus 10 is operated; therefore, the noise between the burring portion 13 and the wedge member 37a is certainly prevented. Each of the retention grooves 35 is formed into the same shape and at the same portion as the retention groove 75 of the first embodiment (see FIG. 6B), therefore ensuring the strength of the wedge member 37a.

According to the first and second embodiments, the gear plate 1 including the internal gear 12 and the burring portion 13 (the first circumferential portion) having the small diameter outer circumferential surface 13a is integrally fixed to the lower arm 11. In addition, the upper arm 2 is formed by the external gear 22 and provided with the press-fit ring 23 (the second circumferential portion) within which the first circumferential portion 13 is disposed in a contacting manner and which has the large diameter inner circumferential surface 23a. Alternatively, the gear plate 1 including the external gear and the second circumferential portion that has the large diameter inner circumferential surface may be integrally fixed to the lower arm 11. Then, the upper arm 2 may include the internal gear and the first circumferential portion which is disposed within the second circumferential portion in a contacting manner and which has the small diameter outer circumferential surface. Further alternatively, the gear plate 1 including the internal gear and the first circumferential portion that has the large diameter inner circumferential surface may be integrally fixed to the lower arm 11. Then, the upper arm 2 may include the external gear and the second circumferential portion which is disposed within the first circumferential portion in a contacting manner and which has the small diameter outer circumferential surface. Accordingly, the second circumferential portion is disposed within the first circumferential portion in a contacting manner at the same side as the engagement portion between the external gear and the internal gear relative to an axial line.

The embodiments are not limited to have the aforementioned configuration and may be appropriately changed or modified within a scope thereof.

As described above, in a case where the first and second wedge members 7a, 7b, 37a are pressed by one of the burring portion 13 (the first circumferential portion) and the press-fit ring 23 (the second circumferential portion) at the pressure portion P, R and therefore the frictional contact of the first and second wedge members 7a, 7b, 37a at the circumferential surface 70a, 36b (the circumferential contact surface) relative to the other of the burring portion 13 and the press-fit ring 23 is maintained under a high contact pressure for a long period of time, the lubricant G that exists at the circumferential surface 70a, 36b of each of the first and second wedge members 7a, 7b, 37a is removed. As a result, the noise may be generated at a time when the seat reclining apparatus 10 is again operated. In such case, however, the lubricant G retained at the retention grooves 35, 75 is quickly supplied to the circumferential surface 70a, 36b of each of the first and second wedge members 7a, 7b, 37a when the seat reclining apparatus 10 is operated after the frictional contact under the high contact pressure for a long period of time. Consequently, a static frictional force generated at each of the circumferential surfaces 70a, 36b of the first and second wedge members 7a, 7b, 37a is reduced so as to press and move the first and second wedge members 7a, 7b, 37a immediately after the operation of the seat reclining apparatus 10. Therefore, the occurrence of the noise is certainly prevented.

According to the aforementioned embodiments, the retention groove 35, 75 includes a plurality of retention grooves 35, 75 formed on portions of the circumferential contact surface 36b, 70a of each of the first and second wedge members 7a, 7b, 37a. The portions of the circumferential contact surface 36b, 70a is prevented from matching the area PP, RR that overlaps the circumferential contact surface 36b, 70a in the extended position from the pressure portion P, R toward the radially outward direction of the drive shaft 6.

The retention grooves 35, 75 are formed at an area other than the stress concentration area of the circumferential surface 70a, 36b of each of the first and second wedge members 7a, 7b, 37a. At this time, the retention grooves 35, 75 formed at the first and second wedge members 7a, 7b, 37a may be a cause of the strength reduction thereof, which may lead to a damage of the first and second wedge members 7a, 7b, 37a resulting from a large load applied to the seat 3 in the event of a collision of the vehicle, for example. However, according to the embodiments, the retention grooves 35, 75 are formed at an area excluding an area where the stress is concentrated by the aforementioned large load, thereby preventing a damage of the first and second wedge members 7a, 7b, 37a caused by the aforementioned large load applied to the seat 3.

According to the aforementioned embodiments, the retention groove 75 is arranged on the circumferential surface 70a formed on the outer peripheral surface 70a of the each of the first and second wedge members 7a, 7b Because the outer peripheral surface 70a of each of the first and second wedge members 7a, 7b is greater in area than the inner peripheral surface 70b, the outer peripheral surface 70a serving as the circumferential contact surface enables a reduction of a contact surface pressure per unit area of the outer peripheral surface 70a that is caused by a pressure applied to the inner peripheral surface 70b. In addition, in a case where the frictional contact of the outer peripheral surface 70a of each of the first and second wedge members 7a, 7b, relative to the inner circumferential surface 23a of the press-fit ring 23 is maintained for a long time, the lubricant G retained in the retention grooves 75 formed on the outer peripheral surface 70a is quickly supplied over the outer peripheral surface 70a at the timing of the re-operation of the seat reclining apparatus 10. As a result, a noise is surely prevented from occurring.

According to aforementioned embodiments, the internal gear 12 and the first circumferential portion 13 including the outer circumferential surface 13a are formed at the first arm 1, 11, and the external gear 22 and the second circumferential portion 23, 25 including the inner circumferential surface 25a within which the first circumferential portion 13 is disposed in a contacting manner are formed at the second arm 2. The diameter of the outer circumferential surface 13a is smaller than the diameter of the inner circumferential surface 25a. Further, each of the first and second wedge members 7a, 7b is configured so that the circumferential contact surface 70a contacts the second circumferential portion 25 and that the pressure portion P is pressed against the first circumferential portion 13, and the drive shaft 6 is positioned coaxially with the internal gear 12 at the first arm 1, 11 and supported thereby.

Thus, sizes of the aforementioned components are appropriately configured in a balanced manner. In addition, each of the first and second wedge members 7a, 7b is pressed at the pressure portion P that extends in the direction of the rotation axis by the burring portion 13 so as to frictionally make contact with the press-fit ring 23 at the outer peripheral surface 70a. As a result, the wedge effect is sufficiently obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
a first arm adapted to be supported by one of members respectively arranged at a seat cushion and a seat back of a seat;
a second arm adapted to be supported by the other of the members respectively arranged at the seat cushion and the seat back of the seat;
an internal gear formed at the first arm;
an external gear formed at the second arm and engaging with the internal gear that is formed at the first arm, the external gear including at least one fewer teeth than the internal gear of the first arm;
a first circumferential portion formed coaxially with the internal gear at the first arm;
a second circumferential portion formed coaxially with the external gear at the second arm;
first and second wedge members accommodated in an accommodating space formed between the first circumferential portion and the second circumferential portion under a condition where one of the first circumferential portion and the second circumferential portion eccentrically contacts the other of the first circumferential portion and the second circumferential portion so that the internal gear and the external gear engage with each other, each of the first and second wedge members including a pressure portion pressed by the one of the first circumferential portion and the second circumferential portion and a circumferential contact surface frictionally contacting the other of the first circumferential portion and the second circumferential portion to thereby bring the first and second wedge members into a wedged state;
a spring arranged between the first and second wedge members and biasing the first and second wedge members in a direction toward first and second ends of the accommodating space, respectively, to thereby realize the wedged state;
a drive shaft rotatably driven by a drive unit around a rotation axis of either one of the first arm and the second arm, the drive shaft moving one of the first and second wedge members in a direction away from one of the first and second ends of the accommodating space depending on a rotation direction of the drive unit in order to release the wedged state of the one of the first and second wedge members and pressing the other of the first and second wedge members into the other of the first and second ends of the accommodating space to move one of the internal gear and the external gear eccentrically relative to the other of the internal gear and the external gear to thereby rotate the second arm relative to the first arm depending on a difference of the number of teeth between the internal gear and the external gear; and
a retention groove retaining a lubricant and formed on the circumferential contact surface of each of the first and second wedge members frictionally contacting the other of the first circumferential portion and the second circumferential portion, the retaining groove extending along a direction of the rotation axis of either one of the first arm and the second arm.

2. The seat reclining apparatus according to claim 1, wherein the retention groove includes a plurality of retention grooves formed on portions of the circumferential contact surface of each of the first and second wedge members, the portions of the circumferential contact surface being prevented from matching an area that overlaps the circumferential contact surface in an extended position from the pressure portion toward a radially outward direction of the drive shaft.

3. The seat reclining apparatus according to claim 2, wherein the retention groove is arranged on the circumferential surface formed on an outer peripheral surface of each of the first and second wedge members.

4. The seat reclining apparatus according to claim 2, wherein the internal gear and the first circumferential portion including an outer circumferential surface are formed at the first arm, and the external gear and the second circumferential portion including an inner circumferential surface within which the first circumferential portion is disposed in a contacting manner are formed at the second arm, a diameter of the outer circumferential surface being smaller than a diameter of the inner circumferential surface, wherein each of the first and second wedge members is configured so that the circumferential contact surface contacts the second circumferential portion and that the pressure portion is pressed against the first circumferential portion, and wherein the drive shaft is positioned coaxially with the internal gear at the first arm and supported thereby.

5. The seat reclining apparatus according to claim 1, wherein the retention groove is arranged on the circumferential surface formed on an outer peripheral surface of each of the first and second wedge members.

6. The seat reclining apparatus according to claim 1, wherein the internal gear and the first circumferential portion including an outer circumferential surface are formed at the first arm, and the external gear and the second circumferential portion including an inner circumferential surface within which the first circumferential portion is disposed in a contacting manner are formed at the second arm, a diameter of the outer circumferential surface being smaller than a diameter of the inner circumferential surface, wherein each of the first and second wedge members is configured so that the circumferential contact surface contacts the second circumferential portion and that the pressure portion is pressed against the first circumferential portion, and wherein the drive shaft is positioned coaxially with the internal gear at the first arm and supported thereby.

\* \* \* \* \*